(12) United States Patent
Gu

(10) Patent No.: US 6,604,748 B2
(45) Date of Patent: Aug. 12, 2003

(54) SLIDING TWIST VEHICLE

(75) Inventor: Hong-Jiun Gu, 6 Fl., No. 67, Lane 27, Alley 372, Sec. 5, Chung Hsu East Road, Taipei (TW)

(73) Assignees: Hong-jiun Gu, Taipei (TW); Jar Chen Wang, Cerritos, CA (US)

( * ) Notice: Subject to any disclaimer, the term of this patent is extended or adjusted under 35 U.S.C. 154(b) by 0 days.

(21) Appl. No.: 09/910,609

(22) Filed: Jul. 23, 2001

(65) Prior Publication Data

US 2003/0015850 A1 Jan. 23, 2003

(51) Int. Cl.⁷ ............................................. B62B 13/10
(52) U.S. Cl. ................... 280/21.1; 280/28.11; 280/845
(58) Field of Search ............................. 280/22.1, 21.1, 280/23.1, 28.11, 28.16, 16, 14.27, 14.28, 14.25, 14.26, 845

(56) References Cited

U.S. PATENT DOCUMENTS

| | | | | |
|---|---|---|---|---|
| 245,571 A | * | 8/1881 | Shepard | 280/21.1 |
| 265,062 A | * | 9/1882 | Haldeman | 280/21.1 |
| 1,742,127 A | * | 12/1929 | Blake | 280/21.1 |
| 2,359,076 A | * | 9/1944 | Asbury | 280/21.1 |
| 2,593,974 A | * | 4/1952 | Brown | 280/21.1 |
| 2,865,032 A | * | 12/1958 | Moody, Jr. | 280/21.1 |
| 3,092,857 A | * | 6/1963 | Churchman | 280/21.1 |
| 3,677,568 A | * | 7/1972 | Nelson | 280/21.1 |
| 3,900,208 A | * | 8/1975 | Hjelmquist | 280/21.1 |
| 6,139,031 A | * | 10/2000 | Wingard | 280/21.1 |

* cited by examiner

*Primary Examiner*—Brian L. Johnson
*Assistant Examiner*—Jeff Restifo
(74) *Attorney, Agent, or Firm*—Raymond Y. Chan; David and Raymond Patent Group

(57) ABSTRACT

A sliding twist vehicle for snowy ground. The sliding twist vehicle includes a vehicle frame, a twisting unit, a transmission unit, and a steering unit. The transmission unit has a control portion, which is extended above the vehicle frame, connected to the steering unit, and a twisting portion, which is extended below the vehicle frame, connected to the driving portion of the twisting unit. The twisting unit further has two sharp edge portions extended along the two sides of the twisting unit from the driving portion respectively, two supporting portions which are spacedly apart from the driving portion. The transmission unit is rotationally connected to the vehicle frame such that when a clockwise and an anti-clockwise movement are subsequently imparted to the steering unit, the twisting unit is twisted as a result, causing the sliding twist vehicle to slide forwardly.

14 Claims, 3 Drawing Sheets

SLIDING TWIST VEHICLE

BACKGROUND OF THE PRESENT INVENTION

1. Field of Invention

The present invention relates to a vehicle, and more particularly to a sliding twist vehicle adapted for driving on snowy ground, wherein a twisting unit is connected to a steering unit by a transmission unit, such that when a clockwise movement and an anti-clockwise movement are subsequently imparted to the steering unit, the sliding twist vehicle can slide and turn on a snowy ground manually.

2. Description of Related Arts

Conventional manual winter sporting instrument and manual transport for snowy ground usually rely on a number of skis sliding on a snowy ground in order to move. This mechanism makes them rely heavily either on externally applied force or inclined nature of landscape. They are generally unable to proceed unless an externally applied force is exerted on them or their riders to start the motion. Further proceeding of such manual winter sporting instrument or manual transport can only be achieved by sliding on downwardly inclined snowy ground. Such a passive nature of winter sporting instrument and manual transport contributes the following disadvantages over the present invention:

1. Control over their proceeding direction and speed are quite difficult for ordinary people and therefore users needed to be well-trained;
2. They are generally unsuitable and sometimes even dangerous for children; and
3. They provide little exercise opportunities for their users.

SUMMARY OF THE PRESENT INVENTION

A main object of the present invention is to provide a sliding twist vehicle for snowy ground wherein the rider of the sliding twist vehicle is able to independently drive the sliding twist vehicle to proceed and control the direction wherein the whole sliding twist vehicle proceeds, so that the user itself can have considerably exercise opportunity.

Another object of the present invention is to provide a sliding twist vehicle for snowy ground, which comprises a main vehicle frame, a twisting unit connected to a steering unit by a transmission unit, such that when a clockwise and an anti-clockwise movement are subsequently imparted to the steering unit, the sliding twist vehicle will be slid forwardly amid a series of twisting motion of the twisting unit.

Another object of the present invention is to provide a sliding twist vehicle for snowy ground, wherein the twisting unit has a thickness gradually increasing with respect to the top front end of the twisting unit, so as to minimize sliding resistance when the sliding twist vehicle is being slid. Moreover, two sharp edge portions of the twisting unit enhance sliding movement of the sliding twist vehicle when it is being slid.

Another object of the present invention is to provide a sliding twist vehicle for snowy ground, wherein the frame-supporting portion of the vehicle frame comprises two side edges which are aligned with the two side edges of the twisting unit respectively, so as to guide the whole sliding twist vehicle to slide straightly and to reduce any unnecessary sliding resistance.

Another object of the present invention is to provide a sliding twist vehicle for snowy ground which further comprises a braking system attached to the main vehicle frame. The braking system can be installed without much complication and cost.

To enhance further understanding of the above objectives and the underlying technological methods of the present invention, the brief description of the drawings below is followed by a detailed description of a preferred embodiment.

DETAILED DESCRIPTION OF THE PREFERRED EMBODIMENT

Figure 1:
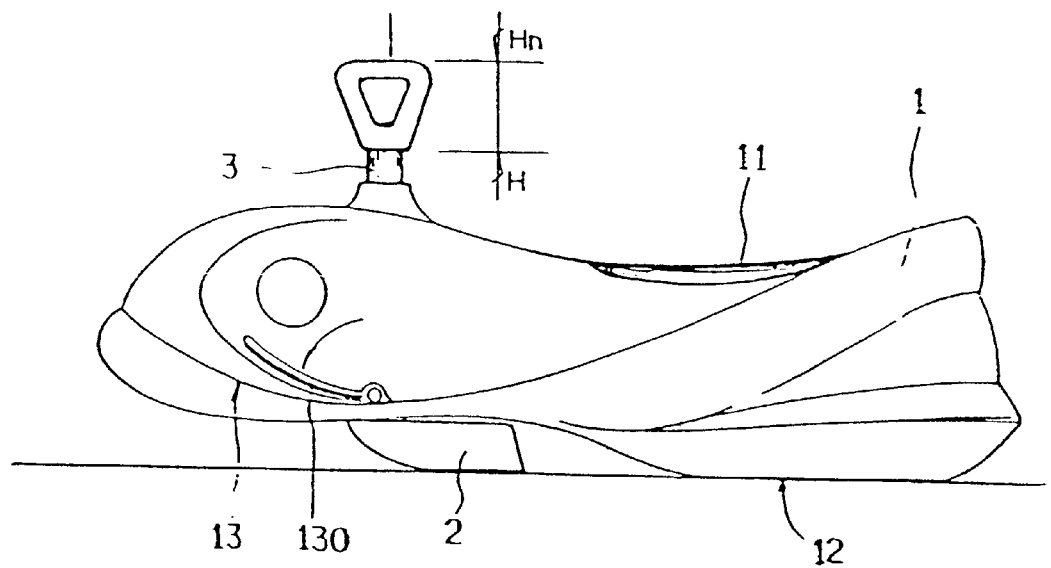
FIG. 1 is a side elevation drawing of the sliding twist vehicle according to the preferred embodiment of the present invention.
Figure 2:
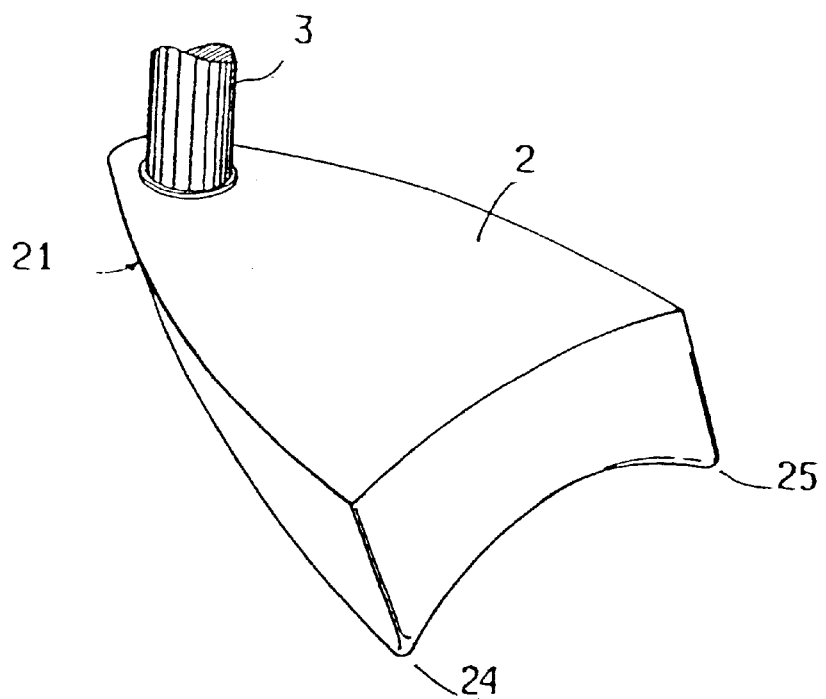
FIG. 2 is an isometric drawing of the twisting unit of the sliding twist vehicle according to the preferred embodiment of the present invention.
Figure 3:
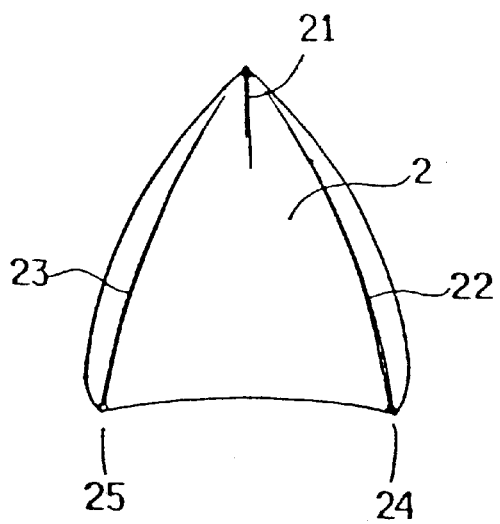
FIG. 3 is a bottom view of the twisting unit of the sliding twist vehicle according to the preferred embodiment of the present invention.
Figure 4:
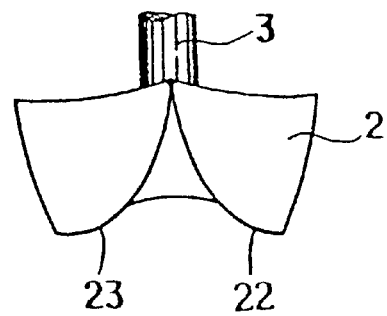
FIG. 4 is a front view of the twisting unit of the sliding twist vehicle according to the preferred embodiment of the present invention.
Figure 5:
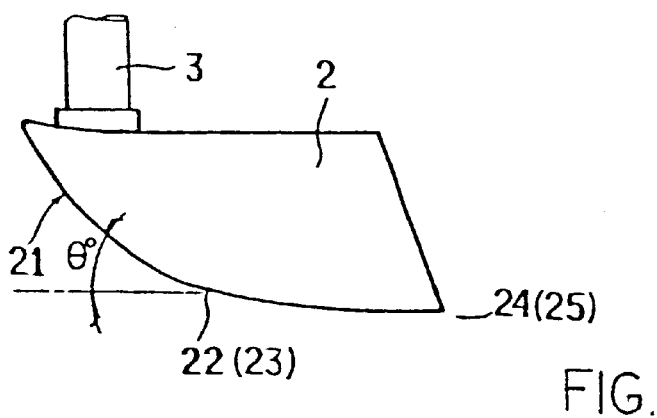
FIG. 5 is a side view of the twisting unit of the sliding twist vehicle according to the preferred embodiment of the present invention.
Figure 6:
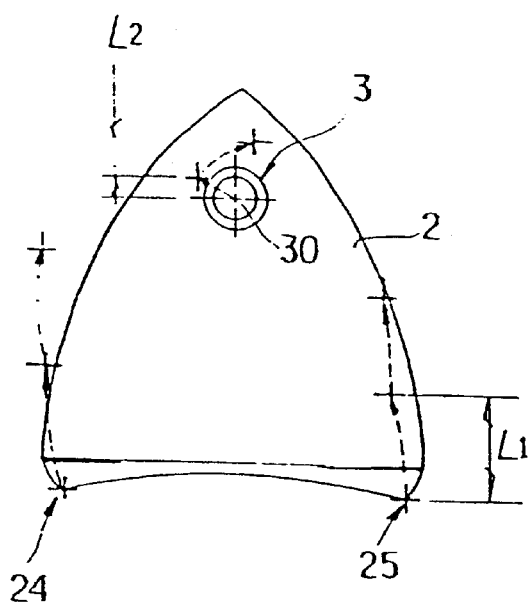
FIG. 6 is a top view of the twisting unit of the sliding twist vehicle according to the preferred embodiment of the present invention.

Referring to FIGS. 1–3 of the drawings, a sliding twist vehicle for snowy ground according to a preferred embodiment of the present invention is illustrated. The sliding twist vehicle as shown in FIG. 1 comprises a vehicle frame 1, a twisting unit 2, a transmission unit 3, and a steering unit 4. The transmission unit 3 has a control portion, which is extended above the vehicle frame 1, connected to the steering unit 3, and a twisting portion, which is extended below the vehicle frame 1, connected to the driving portion 21 of the twisting unit 2. The twisting unit 2 further has two sharp edge portions 22,23 extended along the two sides of the twisting unit 2 from the driving portion 21 respectively, two supporting portions 24,25 which are spacedly apart from the driving portion 21. The transmission unit 3 is rotationally connected to the vehicle frame 1 such that when a clockwise and an anti-clockwise movement are subsequently imparted to the steering unit, so to the control portion of the transmission unit 3, and therefore to the twisting portion of the transmission unit 3, the twisting unit is twisted as a result, causing the sliding twist vehicle to slide forwardly.

Referring to FIG. 1 of the drawings, the vehicle frame 1 comprises a seat frame positioned at the upper rear portion of the vehicle frame 1, a frame- supporting portion 12 positioned at the lower rear portion of the vehicle frame 1, and a pair of legs rest 13 positioned at the front portion of the vehicle frame 1, wherein a rider can drive the sliding twist vehicle by seating on the seat frame 1, putting the legs on the legs rest 13, and imparting a clockwise and an anti-clockwise moment to the steering unit 4 subsequently so as to initiate twisting motion of the twisting unit 2 and in turn the sliding motion of sliding twist vehicle. In case of turning, subsequently imparted clockwise and anti-clockwise movement of steering unit causes twisting of twisting unit 2, thereby balancing any centrifugal force induced by the turning, as in the case of turning of a conventional bicycle.

Referring to FIGS. 1–6 of the drawings, the twisting unit 2 is basically triangular in shape wherein the driving portion 21 has increasing thickness and thus forming a predetermined angle θ with respect to a flat snowy ground. When subsequent clockwise and anti-clockwise movements are imparted to the steering unit 4, the twisting unit 2 will twist about a center point 30 which coincides with the longitudinal axis of the transmission unit 3. The two supporting portions 24,25 are downwardly inclined with respect to a flat snowy ground and therefore effectively act as biasing points when the twisting unit 2 twists. When an anti-clockwise movement is imparted to the steering unit 4, the left supporting portion 24 will act as a biasing point for the right supporting portion 25 to displace forwardly through a distance L1. Because of the rigid nature of the twisting unit 2, the center point 30 will then also displace forwardly through a distance L2. As a result, when subsequent clockwise and anti-clockwise movement are imparted to the steering unit 3 continually, causing continuous twisting of the twisting unit 2, the two supporting portions 24,25 will be displaced consecutively, effectively causing forward displacement of the sliding twisting vehicle.

The twisting unit 2 of the present invention is multi-functional when it is used on snowy ground. The twisting unit 2 can either be used to drive the sliding twist vehicle to move or be used as a braking agent for the sliding twist vehicle when it is sliding on downwardly inclined snowy ground. The most desirable working environment of sliding twist vehicle is hard snowy ground, however, any type of ground which is hard enough and provides biasing effect, such as sandy ground of comparable hardness, is still suitable for sliding twist vehicle.

Figure 7:
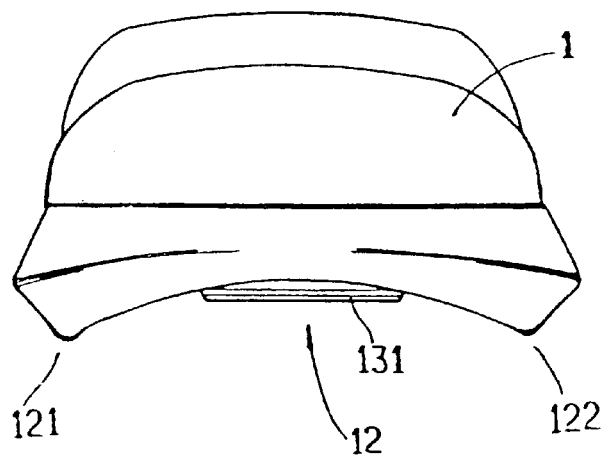
FIG. 7 is a back view of the vehicle frame of the sliding twist vehicle according to the preferred embodiment of the present invention.

Referring to FIG. 7 of the drawings, the frame-supporting portion 12 has two sliding portions 121,122 to enhance forward moving of the sliding twist vehicle. Moreover, the two sliding portions 121,122 increase turning friction between the sliding twist vehicle and the snowy ground during turning so as to prevent skid. When the sliding twist vehicle turns left, the left sliding portion 121 provides support to vehicle frame 1 and to provide necessary friction to oppose centrifugal force during turning, so as to prevent skid of the sliding twist vehicle. Vice versa, when the sliding twist vehicle turns right, the right sliding portion 122 provides support for vehicle frame 1 and to provide necessary friction to oppose centrifugal force during turning, so as to prevent the sliding twist vehicle from skid. Furthermore, the two sliding portions 121,122 and the twisting unit 2 together provide a 3-point support for the sliding twist vehicle. This arrangement enhances the stability and rigidity of the sliding twist vehicle.

Referring to FIGS. 1–7 of the drawings, the sliding twist vehicle further comprises a braking system which comprises a braking paddle 130 pivotally connected to the vehicle frame 1, and a braking unit 131 connected to the braking paddle 130. When a rider activates the braking system by stepping on the braking paddle 130, the braking unit 131 will be lowered to touch the snowy ground so as to provide additional friction for braking the sliding twist vehicle.

What is claimed is:

1. A sliding twist vehicle, comprising:
 a vehicle frame comprising a frame-supporting portion, which is positioned at a lower rear portion of said vehicle, enabling forward moving of said sliding twist vehicle;
 a transmission unit, which is rotatably connected to said vehicle frame, having a control portion upwardly extended above said vehicle frame a twisting portion downwardly extended below said vehicle frame;
 a twisting unit having a driving portion at a front portion thereof, a left supporting portion and a right supporting portion which is provided spacedly apart with each other at a rear portion thereof and has a predetermined distance from said driving portion, and two edge portions provided at two sides thereof and extended from said driving portion to said left and right supporting portions respectively, wherein said twisting portion of said transmission unit is connected to said driving portion while said left and right supporting portions support said twisting unit on ground, wherein said twisting unit gradually reduces a thickness thereof from said left and right supporting portions to said driving portion so as to ensure a bottom surface of said driving portion is not in contact with ground, wherein by swinging said rear portion of said twisting unit clockwise and anticlockwise about said driving portion, said twisting unit is effectively caused to move forward;
 a steering unit connected to said control portion of said transmission, wherein when an anticlockwise movement is imparted to said steering unit, said left supporting portion acts as a left biasing point for said right supporting portion to move forward for a right distance while said driving portion is driven to move forward for a forward distance, wherein when an clockwise movement is imparted to said steering unit, said right supporting portion acts as a right biasing point for said left supporting portion to move forward for a left distance while said driving portion is driven to move forwardly for another forward distance, therefore when subsequent clockwise and anticlockwise movement are imparted to said steering unit continuously, said twisting unit is driven to twist continuously and said left and right supporting portions move forward consecutively so as to effectively cause said sliding twist vehicle to move forwards.

2. The sliding twist vehicle, as recited in claim 1, wherein said left and right supporting portions are downwardly protruded from a bottom surface of said twisting unit and inclined with respect to ground so as to construct as said left and right biasing points for ground contact and supporting.

3. The sliding twist vehicle, as recited in claim 2, wherein said twisting unit is substantially triangular in shape that said driving portion is defined at a front corner portion of said triangular twisting unit while said left and right supporting portions are defined at two remaining corner portions of said triangular twisting unit respectively.

4. The sliding twist vehicle, as recited in claim 3, wherein a predetermined angle is formed at said bottom surface of said driving portion and said two edge portions are sharp edges.

5. The sliding twist vehicle, as recited in claim 3, wherein said frame-supporting portion of said vehicle frame has a left sliding portion and a right sliding portion downwardly protruded to increase turning ground friction for said sliding twist vehicle, wherein said twisting unit and said left and right sliding portions form a three-point support for said sliding twist vehicle, wherein when said sliding twist vehicle turns left, said left sliding portion provides support to said vehicle frame and necessary friction to oppose centrifugal force during left turning and when said sliding twist vehicle turns right, said right sliding portion provides support to said vehicle frame and necessary friction to oppose centrifugal force during right turning, so as to prevent skid of said sliding twist vehicle.

6. The sliding twist vehicle, as recited in claim 5, further comprising a braking system, which comprises a braking paddle pivotally connected to said vehicle frame and a braking unit connected to said braking paddle, wherein when said braking paddle is stepped on to activate said braking system, said braking unit is lowered to apply additional ground friction for braking said sliding twist vehicle.

7. The sliding twist vehicle, as recited in claim 3, further comprising a braking system, which comprises a braking paddle pivotally connected to said vehicle frame and a braking unit connected to said braking paddle, wherein when said braking paddle is stepped on to activate said braking system, said braking unit is lowered to apply additional ground friction for braking said sliding twist vehicle.

8. The sliding twist vehicle, as recited in claim 2, wherein said frame-supporting portion of said vehicle frame has a left sliding portion and a right sliding portion downwardly protruded to increase turning ground friction for said sliding twist vehicle, wherein said twisting unit and said left and right sliding portions form a three-point support for said sliding twist vehicle, wherein when said sliding twist vehicle turns left, said left sliding portion provides support to said vehicle frame and necessary friction to oppose centrifugal force during left turning and when said sliding twist vehicle turns right, said right sliding portion provides support to said vehicle frame and necessary friction to oppose centrifugal force during right turning, so as to prevent skid of said sliding twist vehicle.

9. The sliding twist vehicle, as recited in claim 8, further comprising a braking system, which comprises a braking paddle pivotally connected to said vehicle frame and a braking unit connected to said braking paddle, wherein when said braking paddle is stepped on to activate said braking system, said braking unit is lowered to apply additional ground friction for braking said sliding twist vehicle.

10. The sliding twist vehicle, as recited in claim 8, further comprising a braking system, which comprises a braking paddle pivotally connected to said vehicle frame and a braking unit connected to said braking paddle, wherein when said braking paddle is stepped on to activate said braking system, said braking unit is lowered to apply additional ground friction for braking said sliding twist vehicle.

11. The sliding twist vehicle, as recited in claim 1, wherein said twisting unit is substantially triangular in shape that said driving portion is defined at a front corner portion of said triangular twisting unit while said left and right supporting portions are defined at two remaining corner portions of said triangular twisting unit respectively.

12. The sliding twist vehicle, as recited in claim 1, wherein said frame-supporting portion of said vehicle frame has a left sliding portion and a right sliding portion downwardly protruded to increase turning ground friction for said sliding twist vehicle, wherein said twisting unit and said left and right sliding portions form a three-point support for said sliding twist vehicle, wherein when said sliding twist vehicle turns left, said left sliding portion provides support to said vehicle frame and necessary friction to oppose centrifugal force during left turning and when said sliding twist vehicle turns right, said right sliding portion provides support to said vehicle frame and necessary friction to oppose centrifugal force during right turning, so as to prevent skid of said sliding twist vehicle.

13. The sliding twist vehicle, as recited in claim 12, further comprising a braking system, which comprises a braking paddle pivotally connected to said vehicle frame and a braking unit connected to said braking paddle, wherein when said braking paddle is stepped on to activate said braking system, said braking unit is lowered to apply additional ground friction for braking said sliding twist vehicle.

14. The sliding twist vehicle, as recited in claim 1, further comprising a braking system, which comprises a braking paddle pivotally connected to said vehicle frame and a braking unit connected to said braking paddle, wherein when said braking paddle is stepped onto activate said braking system, said braking unit is lowered to apply additional ground friction for braking said sliding twist vehicle.

* * * * *